United States Patent

[11] 3,526,201

| [72] | Inventor | Glenn F. Larson<br>1042 Arbolado, Santa Barbara, California 93103 |
|---|---|---|
| [21] | Appl. No. | 825,616 |
| [22] | Filed | May 19, 1969 |
| [45] | Patented | Sept. 1, 1970 |

[54] PRECIPITATION RATE GAGE FOR SPRINKLER IRRIGATION SYSTEMS
1 Claim, 2 Drawing Figs.

[52] U.S. Cl............................................................ 116/114,
73/171, 116/110
[51] Int. Cl............................................................ G01f 23/06
[50] Field of Search................................................. 116/114,
114.7, 69, 118, 109, 110; 73/322, 319, 171; 40/41, 116

[56] References Cited
UNITED STATES PATENTS

| 779,462 | 1/1905 | Bosmann.................... | 116/110X |
| 1,267,061 | 5/1918 | De Meyer.................. | 73/319 |
| 2,802,362 | 8/1957 | Lyon........................... | 73/322 |
| 3,309,474 | 3/1967 | Heinrich...................... | 73/171X |

OTHER REFERENCES

"A New Recording Rain Gauge" by A. Hauer, pp. 84 and 85 of the Journal of Scientific Instruments, vol. 28, No. 3, March 1951.

*Primary Examiner*—Louis R. Prince
*Assistant Examiner*—Daniel M. Yasich

ABSTRACT: A sprinkler irrigation signaling gage to determine the precipitation rate at a specific point or, when many gages are used, to determine the uniformity of sprinkler distribution of an installed system. The gage consists of a collection cup and signal float rod adjustably guided vertically for a predetermined distance for indicating to a remote observer when a predetermined amount of water has been collected in the gage.

Patented Sept. 1, 1970   3,526,201

PRECIPITATION RATE GAGE FOR SPRINKLER IRRIGATION SYSTEMS

This invention relates to the measurement of the application or precipitation rate as well as the area water distribution of a sprinkler irrigation system for agriculture or turf. The water distribution and precipitation rate of sprinkler system varies over the irrigated area due to many factors: individual head variation along the radius, system overlap to compensate for wind and system deterioration. The practical result of these variations is a considerable difference in the amount of water applied within the irrigated area. At present this is determined by measuring the amount of water collected in cans over a specific time. While this is a satisfactory method of measuring the amount of water applied in a given time at a specific point, it is too slow and cumbersome to gage the uniformity of distribution of the system in the field by the user. Average precipitation rates vary from 0.25 to 1.0 inches per hour with the trend to lower and lower rates.

An object of this invention is a method of rapid determination of whether a greater amount of water is being applied at one point than another. Then, by changing nozzle sizes, operating pressures or head spacings, the distribution pattern can be varied, the goal being a uniform precipitation rate over the entire irrigated area with this rate matched to the soil's infiltration rate.

Another object is to provide a means of rapidly determining just how much water is being applied at any specific point within the irrigated area.

These objects are accomplished by a gage constructed as shown in the accompanying drawing wherein.

Figure 1:
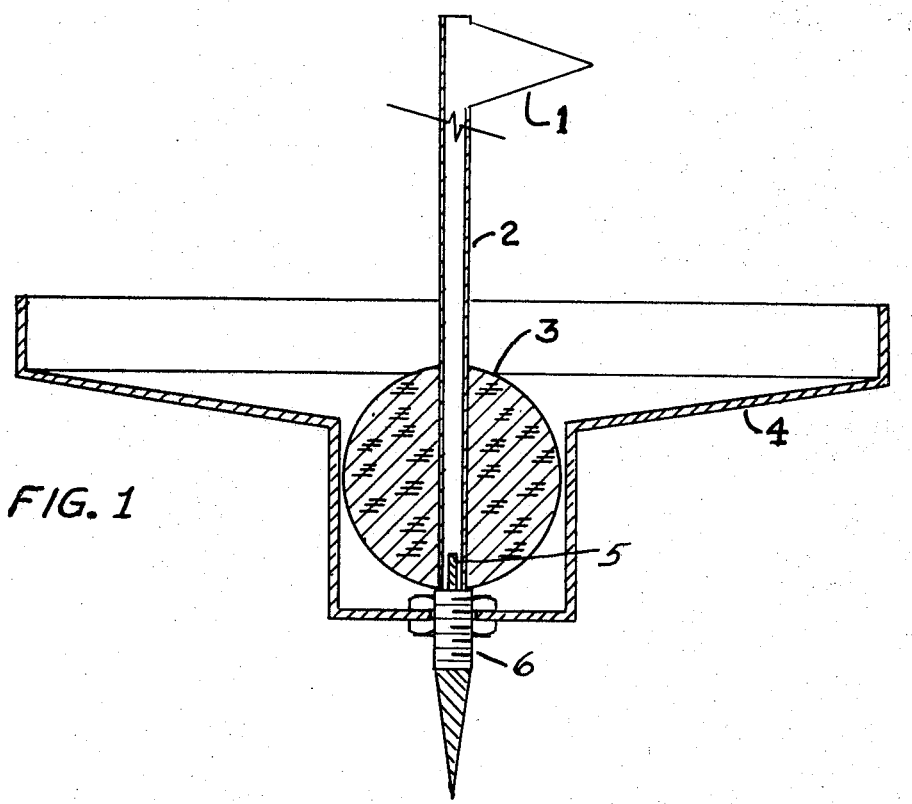
FIG. 1 is a cross sectional view of the gage with the signal flag in place before irrigation has started.
Figure 2:
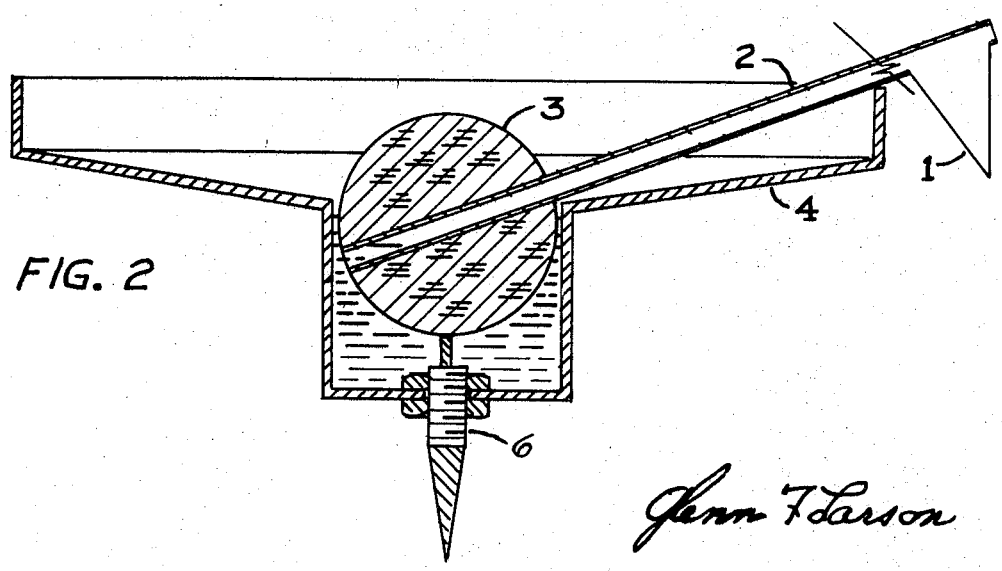
FIG. 2 is a modified cross section of the gage after irrigation water has been collected and showing that the signal flag has floated out of the cup to signal the observer.

The signal float consists of the flag 1, rod 2, and float 3. The collection cup consists of the cup 4, adjustable stud 5, and ground spike 6. The gage is so designed that when a specific amount of water falls in the cup, a practical example is 0.05 inches, the combination of the displacement of the signal float and the length of the adjustable stud 5 will result in the signal float disengaging from the stud and dropping by gravity thereby signaling the observer. A practical example is a six inch diameter cup with the displacement of the signal float and the height of the adjustable stud set so that 0.05 inches of water collected in the cup will disengage the signal float. Assuming a constant application rate of water in the irrigation system, 0.05 inches collected in six minutes or one-tenth of an hour is equivalent to 0.05 inches times ten or 0.05 inches per hour.

Where the uniformity of the precipitation rate is to be determined, many gages are located in the irrigation field and the length of time between the first signal and the last signal is noted. This is direct indication of the uniformity of the system distribution.

The foregoing disclosure relates to only a preferred embodiment of the invention and it is the intent to cover all changes and modifications of the example of the invention herein chosen for the purposes of the disclosure which do not constitute departures from the spirit and scope of the invention.

I claim:

1. A gage for indicating the amount of liquid collected at any location within a sprinkler system comprising: a collection cup, a ground spike to hold the cup in the ground, a float positioned in said collection cup, an elongated float rod extending upwardly from said float, a signal flag connected to one end of said elongated rod, an aperture in the lower end of said float, and adjustable stud means secured through the bottom of said collection cup to said ground spike, said float being mounted on said stud with the stud projecting into the aperture in said float, whereby said float and rod may be mounted in a vertical position on said stud and be raised by the rising level of the liquid being sensed until the float disengages itself from said stud, whereupon said float and rod topple by gravity to give said indication.